United States Patent
Richardson (10) Patent No.: US 8,480,922 B2
(45) Date of Patent: Jul. 9, 2013

(54) SOLID SOLUTION LITHIUM ALLOY CERMET ANODES

(75) Inventor: Thomas J. Richardson, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 606 days.

(21) Appl. No.: 12/665,004

(22) PCT Filed: Jun. 5, 2008

(86) PCT No.: PCT/US2008/065966
§ 371 (c)(1),
(2), (4) Date: Dec. 16, 2009

(87) PCT Pub. No.: WO2008/157067
PCT Pub. Date: Dec. 24, 2008

(65) Prior Publication Data
US 2010/0181528 A1    Jul. 22, 2010

Related U.S. Application Data

(60) Provisional application No. 60/944,932, filed on Jun. 19, 2007.

(51) Int. Cl.
*H01M 4/88* (2006.01)
*H01B 1/00* (2006.01)
*H01B 1/12* (2006.01)
*H01M 4/13* (2010.01)
*H01M 4/58* (2010.01)

(52) U.S. Cl.
USPC ....... 252/182.1; 252/500; 429/62; 429/218.1; 429/224; 429/231.95

(58) Field of Classification Search
USPC .............. 252/182.1, 500; 429/62, 199, 218.1, 429/220, 221, 223, 224, 225, 231.5, 231.9, 429/231.95; 455/413, 414.1
See application file for complete search history.

(56) References Cited

U.S. PATENT DOCUMENTS 3,895,962 A    7/1975    Mead
(Continued)

OTHER PUBLICATIONS

Howlett et al., "A sealed optical cell for the study of lithium-electrode/electrolyte interfaces," Journal of Power Sources, vol. 114, pp. 277-284, (2003).

(Continued)

*Primary Examiner* — Bijan Ahvazi
(74) *Attorney, Agent, or Firm* — Lawrence Berkeley National Laboratory (57) ABSTRACT

A metal-ceramic composite ("cermet") has been produced by a chemical reaction between a lithium compound and another metal. The cermet has advantageous physical properties, high surface area relative to lithium metal or its alloys, and is easily formed into a desired shape. An example is the formation of a lithium-magnesium nitride cermet by reaction of lithium nitride with magnesium. The reaction results in magnesium nitride grains coated with a layer of lithium. The nitride is inert when used in a battery. It supports the metal in a high surface area form, while stabilizing the electrode with respect to dendrite formation. By using an excess of magnesium metal in the reaction process, a cermet of magnesium nitride is produced, coated with a lithium-magnesium alloy of any desired composition. This alloy inhibits dendrite formation by causing lithium deposited on its surface to diffuse under a chemical potential into the bulk of the alloy.

13 Claims, 6 Drawing Sheets

U.S. PATENT DOCUMENTS

| | | | |
|---|---|---|---|
| 5,102,475 | A | 4/1992 | Raynaud et al. |
| 5,350,647 | A | 9/1994 | Hope et al. |
| 5,705,293 | A | 1/1998 | Hobson |
| 6,187,477 | B1 * | 2/2001 | Watanabe et al. ........ 429/231.95 |
| 7,042,615 | B2 | 5/2006 | Richardson |
| 2002/0015890 | A1 * | 2/2002 | Nakura .................... 429/231.95 |

OTHER PUBLICATIONS

Richardson et al., "Solid solution lithium alloy cermet anodes," Journal of Power Sources, vol. 174, pp. 810-812, (2007).

Tarascon et al., "Issues and challenges facing rechargeable lithium batteries," Nature, vol. 414, pp. 359-367, (Nov. 15, 2001).

* cited by examiner

SOLID SOLUTION LITHIUM ALLOY CERMET ANODES

CROSS REFERENCE TO RELATED APPLICATIONS

This application claims priority to PCT Application, International Application No. PCT/US2008/065966, filed Jun. 5, 2008, and entitled Solid Solution Lithium Alloy Cermet Anodes, which in turn claims priority to Provisional Patent Application Ser. No. 60/944,932, filed Jun. 19, 2007, also entitled Solid solution Lithium Alloy Cermet Anodes, each of which applications is incorporated herein by reference as if fully set forth in its entirety.

STATEMENT OF GOVERNMENTAL SUPPORT

The invention described and claimed herein was made in part utilizing funds supplied by the U.S. Department of Energy under Contract No. DE-AC02-05CH11231. The Government has certain rights in this invention.

BACKGROUND OF THE INVENTION

1. Field of the Invention

This invention relates generally to electrode materials for lithium ion batteries, and, more specifically, to lithium alloy cermet materials and methods for making same.

2. Description of the Related Art

Lithium metal anodes are unworkable in rechargeable batteries containing liquid electrolytes due to dendrite formation, which leads to performance degradation and unsafe conditions. Despite these problems, lithium is an attractive anode material due to its high energy density. Incorporation of lithium metal into electrodes or other devices is difficult because it is a soft, sticky material, with the consistency of chewing gum. It is sometimes mixed with ceramic powders (with considerable difficulty) to make it easier to handle, but this does not significantly increase its surface area. It would be useful to have lithium in a form that has very high surface area in order to maximize the power density. Although some success has been achieved with Li metal electrodes and high temperature solid polymer electrolytes, these batteries are not acceptable for many applications. Current electrodes use lithium stored in graphite intercalation electrodes or in complex alloys containing tin or silicon.

Because of their very large theoretical capacities, lithium alloys such as Li—Sn and Li—Si are attractive candidates to replace graphite as electrode material in lithium ion batteries. In practice, however, the binary materials suffer from significant irreversible capacities, poor cyclability, and questionable rate capability. The problems arise from the complexity of the phase diagrams and the fact that substantial atomic rearrangements and large volume changes accompany a series of first-order phase transitions. Thus fresh surfaces are produced and exposed to the electrolyte, causing disconnection and isolation of active material, and inhomogeneity within the composite electrode.

An electrode in which a solid solution of lithium and another element can exist over a wide composition range would be highly advantageous. Then charging and discharging could result in continuous and relatively stress-free volume changes similar to those in a well-behaved lithium foil electrode, thus reducing irreversible capacity losses and electrolyte consumption. More importantly, a solid solution exhibits a sloping potential vs. composition profile, which reflects the presence of a driving force for relaxation to a uniform composition. Given sufficient mobility in the alloy, lithium would be transported away from the surface during deposition, countering the tendency to faun dendrites.

There are few examples of solid solutions of lithium and another element that can exist over a wide composition range and also have significant capacities. The Li—Sn (lithium-tin) and Li—Si (lithium-silicon) systems have good capacities but remain as solid solutions over only very limited composition ranges. There is a single phase over a range from 38% to 62% lithium in the Li—Hg (lithium-mercury) system, but its capacity is low at only 129 mAh/g. There is a single phase over even smaller ranges for the Li—In (lithium-indium) and Li—Cd (lithium-cadmium) systems. The most attractive candidate is the Li—Mg (lithium-magnesium) system, which has a solid solution with the body centered cubic (bcc) lithium structure over the entire range from 30% to nearly 100% lithium. In the range from 40% to 70% Li, for example, the Li—Mg solid solution has a capacity of 1100 mAh/g.

Li—Mg alloy anodes have been described previously by R. T. Mead in U.S. Pat. No. 3,895,962 (1975); G.-M. Raynaud, G. Regazzoni, G. Nussbaum, and M. Reboul in U.S. Pat. No. 5,102,475 (1992); S. F. Hope and J. B. Kejha in U.S. Pat. No. 5,350,647 (1994); and D. O. Hobson in U.S. Pat. No. 5,705,293 (1998). Although the Li—Mg system is known to have high mobility for lithium in the solution phase, Li—Mg alloys have not been used in manufacturing rechargeable batteries.

What are needed are materials that can use Li-M (lithium-metal) alloys with wide ranges of solid solubility and high capacities in electrodes with high surface areas, thereby enhancing power performance and reducing macroscopic volume changes.

SUMMARY OF THE INVENTION

High quality Li and Li-metal alloys are difficult to prepare and handle in the laboratory due to their reactivity and high melting temperatures. A convenient metathesis reaction by way of this invention has been developed which produces an easily-formed cermet containing a high surface area Li or Li-M intermetallic alloy coating a ceramic second phase. In the method of the invention, a lithium nitride composition is reacted with a metal, in one embodiment, the metal being magnesium. By using an excess of magnesium metal in the reaction process, a cermet of magnesium nitride, coated with a lithium-magnesium alloy of any desired composition can be produced. Lithium nitride may also be reacted with other metals such as aluminum, tin, silicon, etc to similarly form the corresponding lithium metal composition.

It has not previously been possible to form such high surface area Li materials directly from Li due to its physical characteristics. Furthermore, the ability to form the mixture into a desired shape prior to reaction can facilitate production of highly porous electrodes with minimal post reaction manipulation.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

According to the present invention, a process and materials therefore is disclosed for making Li-M alloys with wide ranges of Li compositions in a single phase and ways to form these materials that make them suitable as anodes capable of performing well through the rigors of long-term use in Li ion cells. In addition, new cermet-Li and cermet-Li-M materials are also disclosed.

Lithium-magnesium alloys have in the past been prepared by melting lithium foil and magnesium powder or ribbon in a steel crucible in an argon atmosphere. By those processes, alloys with Mg content up to 30% were melted in an open crucible furnace in a controlled atmosphere glove box. Metal mixtures with higher Mg content were placed in a tantalum crucible and sealed in a copper-gasketed stainless steel container, then heated in a box furnace. The alloy ingots were cold-rolled into foils between spring steel sheets to prevent adhesion to the rollers.

Lithium-rich Li—Mg alloys are soft and tend to stick to rollers or protective sheets when rolled to make foils. Mg-rich alloys require high temperatures for preparation and are difficult to extract from crucibles. In addition, at each composition, the molten alloy passes through a peritectic region before it solidifies completely, resulting in precipitation of solid solution grains of varying composition. While the inhomogeneity can be removed by annealing, it causes the freshly cooled metal to fracture during rolling.

In contrast, the metathesis reaction between lithium nitride and magnesium metal described below in accordance with one embodiment of the invention takes place below the melting point of the alloy and produces an easily formed, intimate mixture of electrochemically inert magnesium nitride and a lithium-magnesium alloy of any desired composition. The ceramic-metallic composite cermet can be pressed into discs, rolled into sheets, and cut into any desired shape. The $Li_3N$/Mg mixture can also be formed prior to reaction.

Cermets (ceramic-metal composites) are used widely in industry (as porous electrodes in solid oxide fuel cells, for example) because they are more heat-resistant than metals, have greater fracture toughness, and can be formed by plastic deformation. They are typically made by sintering of intimate mixtures of ceramic and metal powders, but in some cases, the ceramic portion is formed by oxidation of a metallic precursor. A microporous lithium or lithium alloy cermet containing a lightweight ceramic component has certain advantages over its metallic counterpart both in performance and manufacturing. Maintaining porosity during mixing of soft lithium metal with a ceramic powder, however, is difficult. Magnesium powder, on the other hand, mixes easily with lithium nitride, and both can be obtained as very fine powders. After reaction by metathesis, the ceramic component in the final product is magnesium nitride. The metallic component can be pure lithium or lithium-magnesium alloy of any desired composition, depending on the amount of magnesium powder used in the reaction.

In the past, cermets of this type were made from the final constituents, rather than by a reaction route. As the constituents are very difficult to mix and shape or mold, the result has been a material that is not intimately mixed, is inhomogeneous, has low surface area, and has few advantages over lithium foil. The reaction approach described above allows formation of a free-flowing precursor mixture (which may include binders or other additives such as surfactants) into a desired shape before reaction. Alternatively, the reaction product itself can also be shaped readily, for example, by pressing or rolling. The reaction process overcomes the limitations presented by the adverse mechanical properties of the individual metals by rejecting the assumption that the individual metals themselves must be used as the starting materials for the preparation.

Figure 1A:
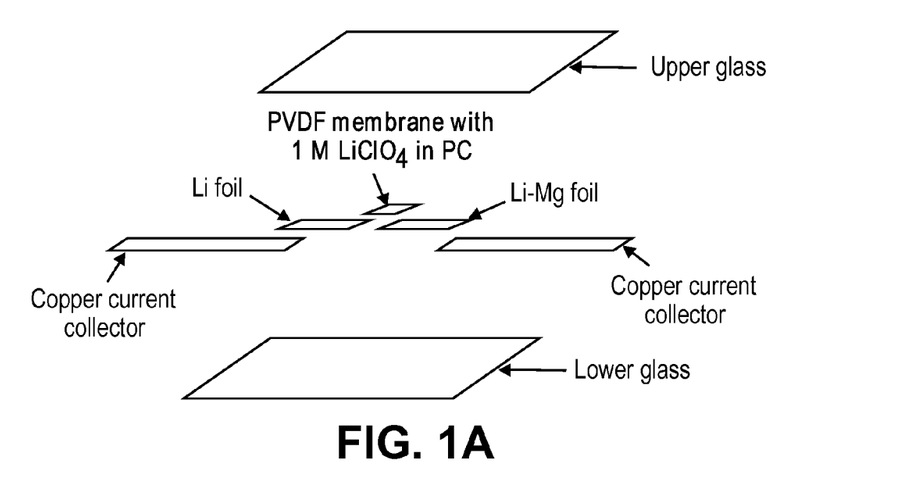
FIG. 1a is a schematic diagram of a transparent cell.
Figure 1B:
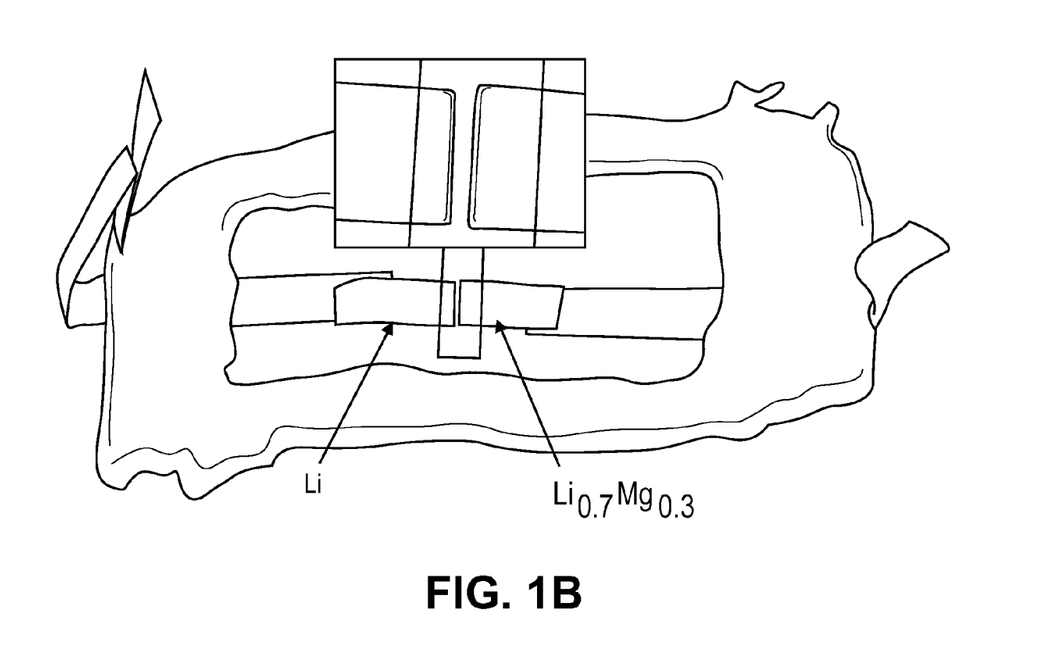
FIG. 1b is a drawn image of a transparent cell. The gap between electrodes is 1 mm.

The transparent cells used for the visual observations made herein of electrode surfaces during cycling, as shown in FIG. 1, are similar to those described by Howlett et al. (P. C. Howlett, D. R. MacFarlane, and A. F. Hollenkamp, J. Power Sources 114 (2003) 277.). Li and/or $Li_{0.7}Mg_{0.3}$ foils (about 0.3 mm thick, 4 mm wide and 10 mm long) were pressed onto copper current collectors placed on top of a glass slide. The distance between the electrodes was 1 mm. A piece of polyvinylidene difluoride (PVDF) membrane (1 mm×4 mm, Gelman FP Vericel) wetted by 1 M $LiClO_4$ in propylene carbonate was placed between the electrodes so that only the opposing edges were in contact with the electrolyte. Another glass plate was laid on the top of the assembly, and the cell was sealed with low vapor pressure epoxy (Ton-seal, Varian Associates) before removal from the glove box. Galvanostatic charge-discharge cycling was performed using a Gamry potentiostat. Each cycle consisted of a charge and discharge of 3 C/$cm^2$ at a current density of 2 mA/$cm^2$ (25 min). Images were collected using a CCD camera coupled to an optical microscope.

Figure 2:
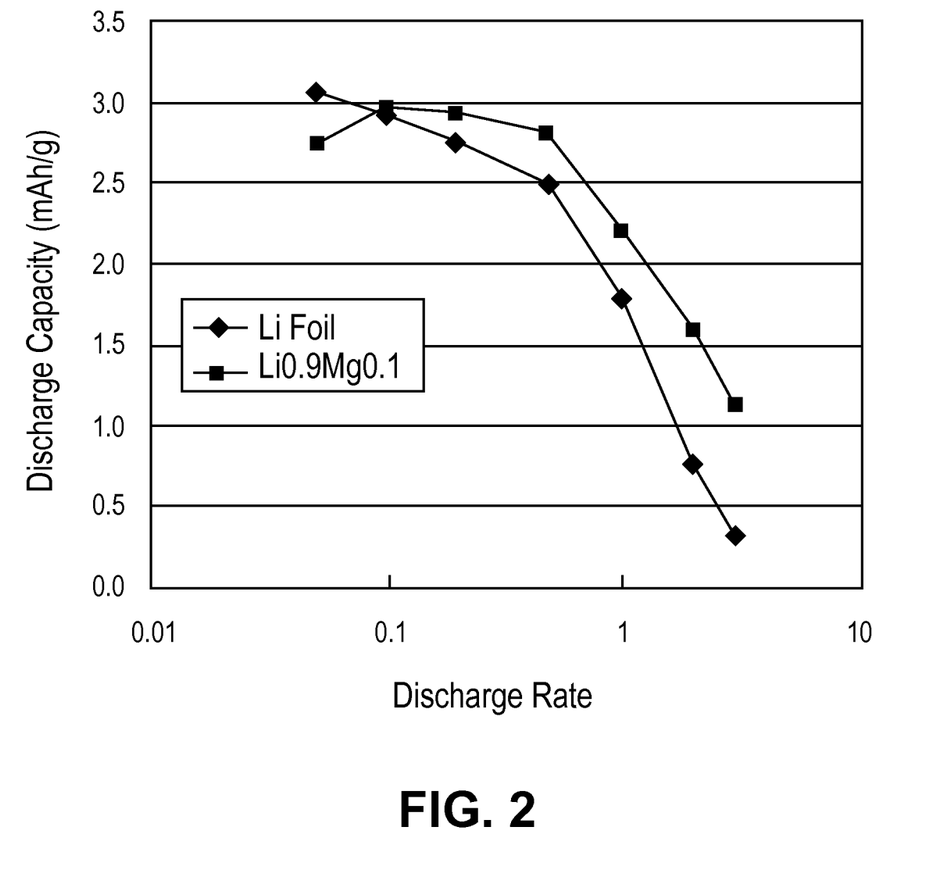
FIG. 2 is a plot that shows discharge capacity vs. rate for $Li_{1.1}Mn_{0.3}Ni_{0.3}Co_{0.3}O_2$ cells with Li and $Li_{0.9}Mg_{0.1}$ anodes and 1M $LiPF_6$ in ethylene carbonate-ethylmethylcarbonate (3:7).

The cells were constructed using high-rate positive electrodes for comparison of rate performance and impedance of Li and $Li_{0.9}Mg_{0.1}$ foil anodes. FIG. 2 is a plot of discharge capacity vs. rate for $Li_{1.1}Mn_{0.3}Ni_{0.3}Co_{0.3}O_2$ cells with Li and $Li_{0.9}Mg_{0.1}$ anodes and 1M $LiPF_6$ in ethylene carbonate-ethylmethylcarbonate (3:7). The rate performance of the cell containing the alloy foil was substantially better than that using pure lithium.

In a first embodiment of the invention, LiMg—$Mg_3N_2$ cermets are prepared by mixing $Li_3N$ powder (<150 μm particle size) with Mg powder (<45 μm particle size) according to Equation (1):

$$2Li_3N+(3+x)Mg \rightarrow Li_6Mg_x+Mg_3N_2 \qquad (1)$$

and heating to the melting point of the alloy phase (310° to 480° C. for 20 to 40 at % Mg) in a tantalum boat. The reaction product, magnesium nitride grains coated with a layer of a nitrogen free lithium (when x=0) or a nitrogen free lithium magnesium alloy (when x≠0), is a free-flowing powder and can be pressed into discs of varying porosity depending upon the applied pressure. These can be used as is or rolled into thin sheets and cut in the same manner as foils. It is also possible to press the raw powder mixture into discs, which retain their shape after heating with only a small amount of shrinkage due to sintering.

Figure 3:
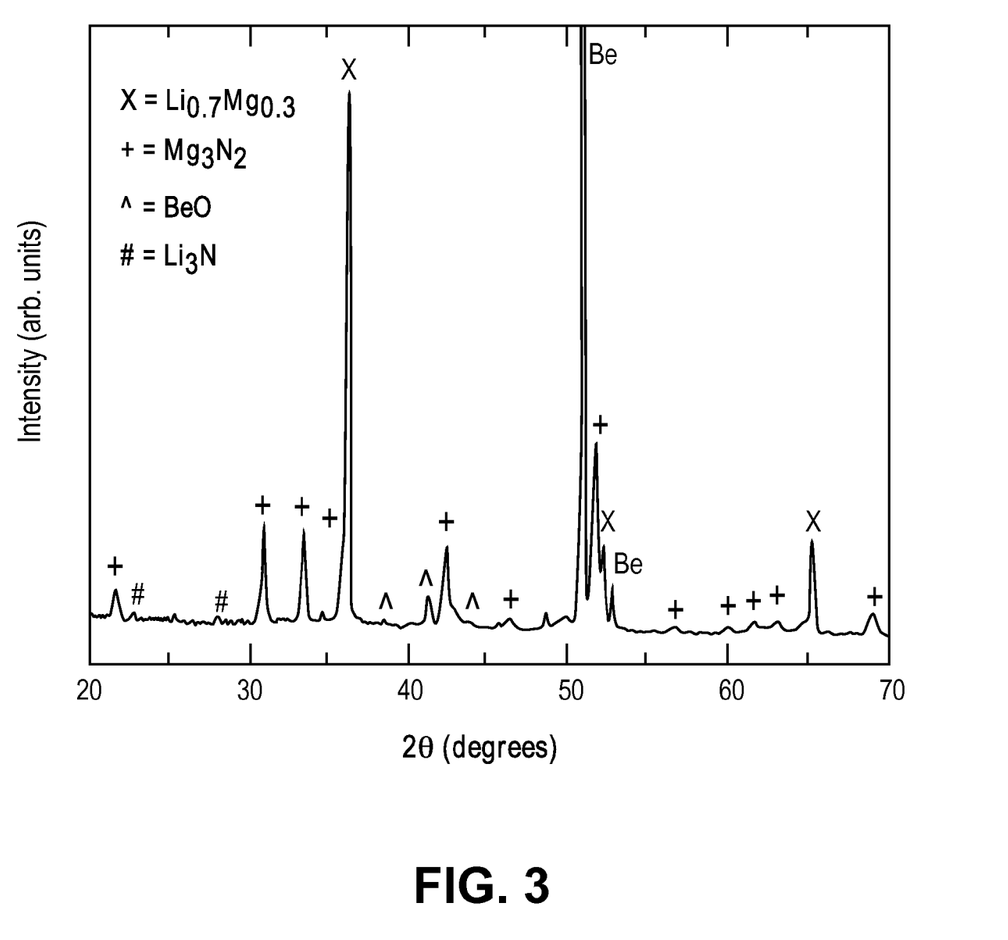
FIG. 3 is an x-ray powder diffraction pattern of $Li_{0.7}Mg_{0.3}$—$Mg_3N_2$ cermet.

X-ray diffraction patterns were obtained from pressed discs protected from reaction with air by a beryllium window. An x-ray diffraction pattern from a cermet containing $Li_{0.7}Mg_{0.3}$ (51 wt %, 74 vol %) and $Mg_3N_2$ is shown in FIG.

3. The peak positions for $Li_{0.7}Mg_{0.3}$ are shifted slightly from those of pure lithium in agreement with the known lattice parameters. A small amount of unreacted $Li_3N$ is present, but no residual Mg.

The same process can be used with other metals and lithium-containing precursors to make cermets with different compositions. Other metals include aluminum, tin, silicon, antimony, germanium, gallium, indium, and their alloys with magnesium or lithium and with one another. For example, lithium-aluminum cermets can be made according to Equation 2:

$$Li_3N + Al \rightarrow 3Li + AlN \quad (2)$$

or Equation 3:

$$4Li_3N + 4Al \rightarrow 3LiAl + AlN \quad (3)$$

Lithium-silicon cermets ($LiSi_x$—$Si_3N_4$) can be made from silicon powder and lithium nitride according to Equation (4):

$$4Li_3N + 3Si \rightarrow 12Li + Si_3N_4 \quad (4)$$

or Equation (5)

$$4Li_3N + (3+x)Si \rightarrow Li_{12}Si_x + Si_3N_4 \quad (5)$$

Under the same or other conditions, nitrogen gas may be produced (either alone or in combination with $Si_3N_4$) in the reaction between lithium nitride and silicon according to Equation 6:

$$2Li_3N + ySi \rightarrow Li_6Si_y + N_2 \quad (6)$$

In one experiment, 0.508 g $Li_3N$ was mixed with 0.835 g Si. The mixture was heated in a tantalum crucible in an argon atmosphere for 16 h at 450° C. The resulting deep purple powder contained $Li_6Si_{3.5}$ along with small amounts of unreacted $Li_3N$ and Si. Further heat treatment reduced the quantities of the unreacted materials. For such resulting LiSi powders, it may be useful to add binders to the powder where the resulting composite composition is to be formed into a desired shape, such as an electrode, to improve its malleability. For metals, such as tin, which do not readily displace Li from $Li_3N$, sufficient Mg may be added to the reaction mixture to form $Mg_3N_2$, and the Li produced thereby reacts with the other component(s). For example:

$$2Li_3N + 3Mg + ySn \rightarrow Li_6Sn_y + Mg_3N_2 \quad (7)$$

A similar reaction can also be achieved with silicon, according to the formula below:

$$2Li_3N + 3Mg + ySi \rightarrow Li_6Si_y + Mg_3N_2 \quad (8)$$

Ternary alloy cermets can be prepared in the same manner from reaction mixtures containing additional metals or alloys thereof. For example:

$$2Li_3N + 3Mg + ySn + zSi \rightarrow Li_6Sn_ySi_z + Mg_3N_2 \quad (9)$$

or $$2Li_3N + 3Mg + Sn_ySi_z \rightarrow Li_6Sn_ySi_z + Mg_3N_2 \quad (10)$$

Figure 4:
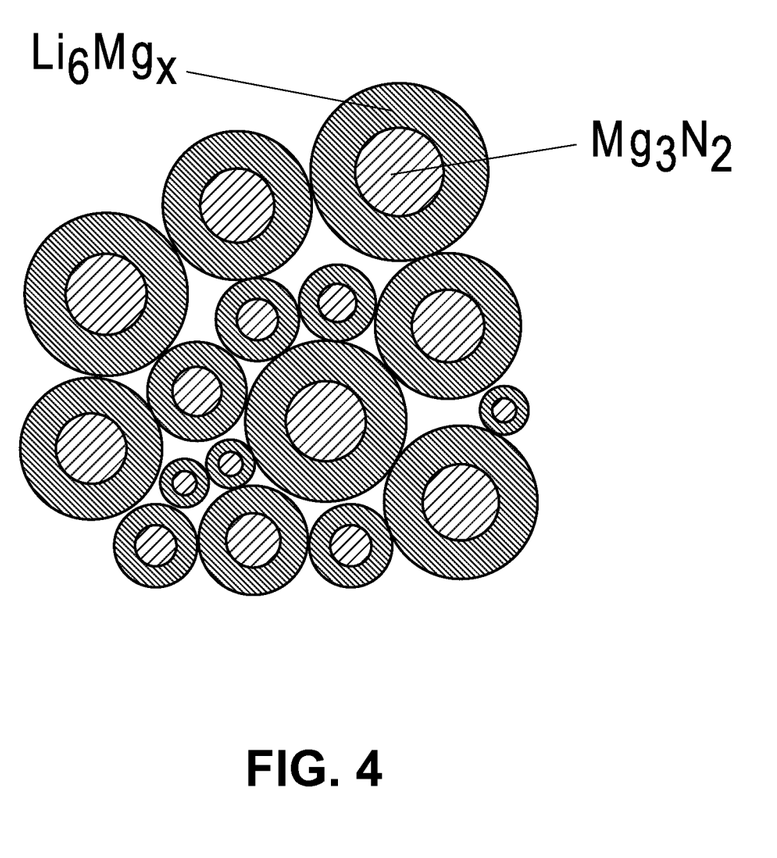
FIG. 4 is a schematic diagram of Li—Mg—$Mg_3N_2$ cermet structure.

When the cermet-forming reaction is carried out at a temperature in excess of the melting point of the metallic phase(s), the ceramic component may be encapsulated by the metal as shown in FIG. 4. The sintered structure gives the cermet mechanical stability. When used as an electrode, it promotes internal conduction of electrical charge while exposing a large active surface area of the metal to the electrolyte.

It should be appreciated that the lithium-metal compositions of this invention may form as solid solutions or intermetallic compounds, depending upon the nature of the metal component combined with the lithium, and/or the particular reaction route selected. In some cases, in fact, the resulting product may be a mixture of alloy and intermetallic compound. The produced compositions of the invention generally are obtained as free flowing powders. In an embodiment of the invention, it may be desirable to intentionally sinter the product during the formation reaction, so that the resulting material maintains its form, and/or is easier to roll into a foil.

Figure 5A:
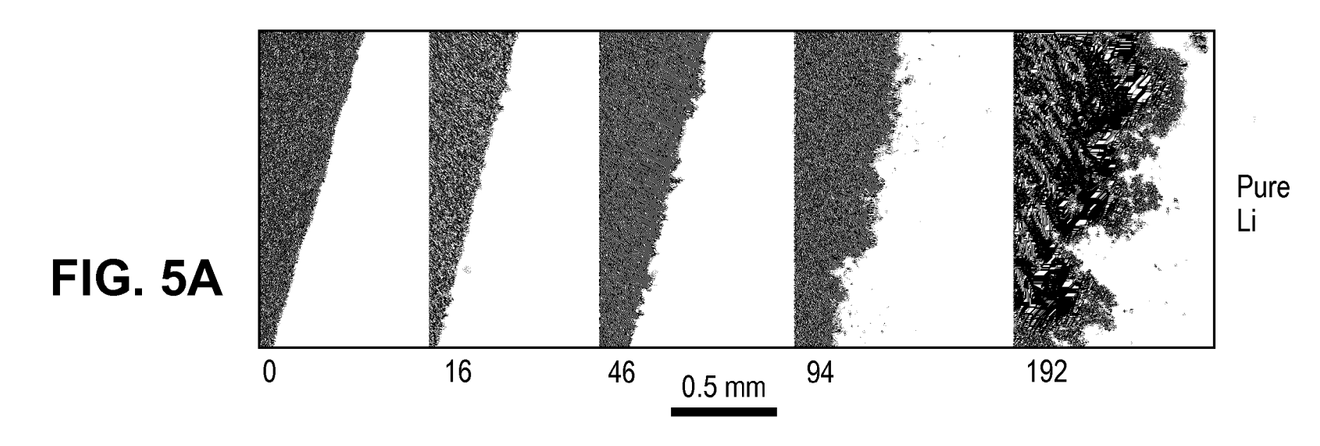
FIG. 5a is a series of optical micrographs of a lithium electrode surface.

FIG. 5a shows characteristic behavior of Li during stripping and plating in non-aqueous electrolytes. (Stripping is used in this context to mean the opposite of plating. i.e., dissolution due to the passage of current.) FIG. 5a shows a series of optical micrographs of a lithium electrode surface following 0, 16, 46, 94, and 192 cycles of lithium consumption and deposition in amounts typical of those occurring in a rechargeable lithium ion battery. The counter electrode is Li foil. Dendrites formed during plating become disconnected from the surface during stripping and form a mass of loose particles, which is pushed away from the surface as new dendrites form behind it during plating. This is the mechanism by which lithium cells typically become shorted, rather than by single dendrites extending across the separator.

Figure 5B:
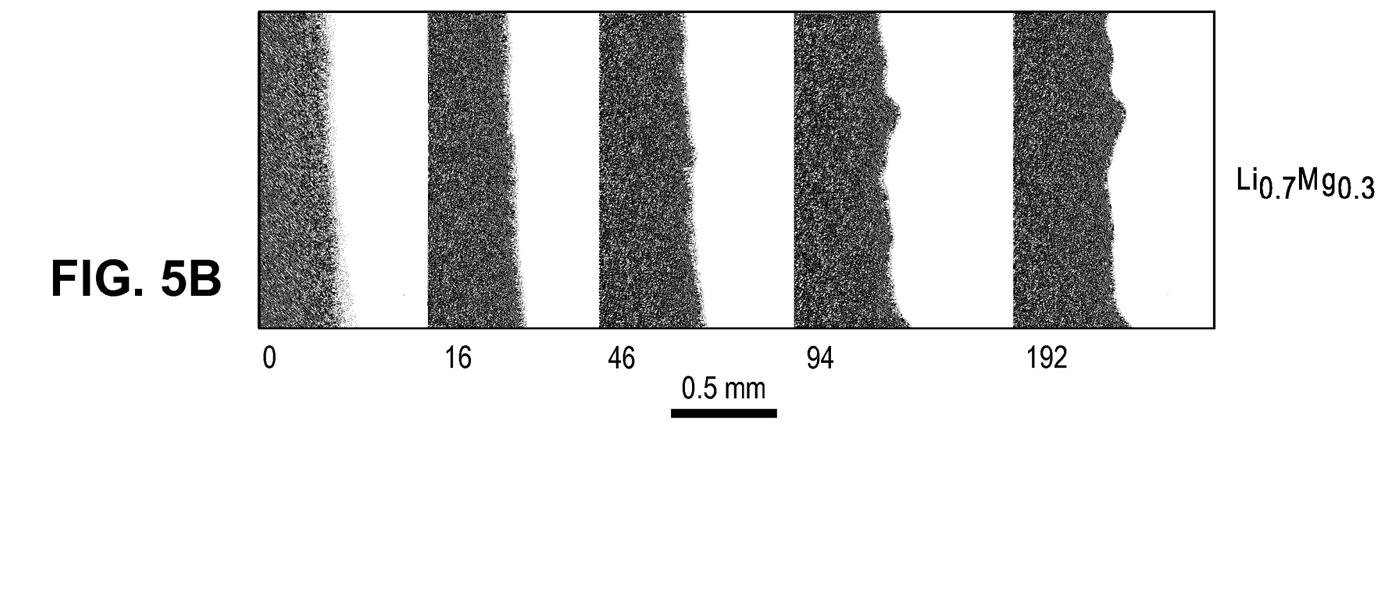
FIG. 5b is a series of optical micrographs of a $Li_{0.7}Mg_{0.3}$ electrode surface. The micrographs show the surfaces following 0, 16, 46, 94, and 192 cycles. The counter electrode in each case was Li foil.

FIG. 5b is a series of optical micrographs of a $Li_{0.7}Mg_{0.3}$ electrode surface also following 0, 16, 46, 94, and 192 cycles and with a Li foil counter electrode. Although the Li—Mg alloy surface becomes rougher with cycling, and nodules of significant dimensions are produced, small dendrites are not observed, and particles are not released into the electrolyte.

Without wishing to be bound to any particular theory, this may be understood by considering the state of lithium atoms freshly deposited on the alloy surface. The high concentration of lithium at the surface and the lower chemical potential of lithium within the bulk alloy (as measured by a potential difference of about 30 mV) may provide a driving force for lithium to diffuse into the bulk. This may even result in dissolution of pure lithium from protruding features and re-deposition on nearby flat surface areas with higher Mg content. No increase in cell impedance was observed over the course of several hundred cycles.

During lithium stripping at low rates, lithium diffuses toward the surface as it becomes depleted. At higher rates, however, the Li content at the surface may fall below the minimum (30 at %) required to maintain the body centered cubic Li phase in which Li has high mobility. Formation of the hexagonal close packed Mg solid solution phase results in a rapid shutdown of lithium diffusion and an increase in the electrode potential. This may occur at rates as low as 0.5 $mA/cm^2$, but it varies with electrolyte concentration and cell configuration. At potentials above about 0.65 V vs. Li, Mg may be dissolved along with lithium. Although this behavior imposes a discharge rate limit that may be undesirable in a high power cell, it may provide a measure of protection against rapid discharge or inadvertent shorting of a high energy density cell. Increasing the surface area by introducing porosity could increase the rate capability, but a dense metal foil electrode of this type could be susceptible to slow degradation due to dimensional changes during cycling.

Figure 6:
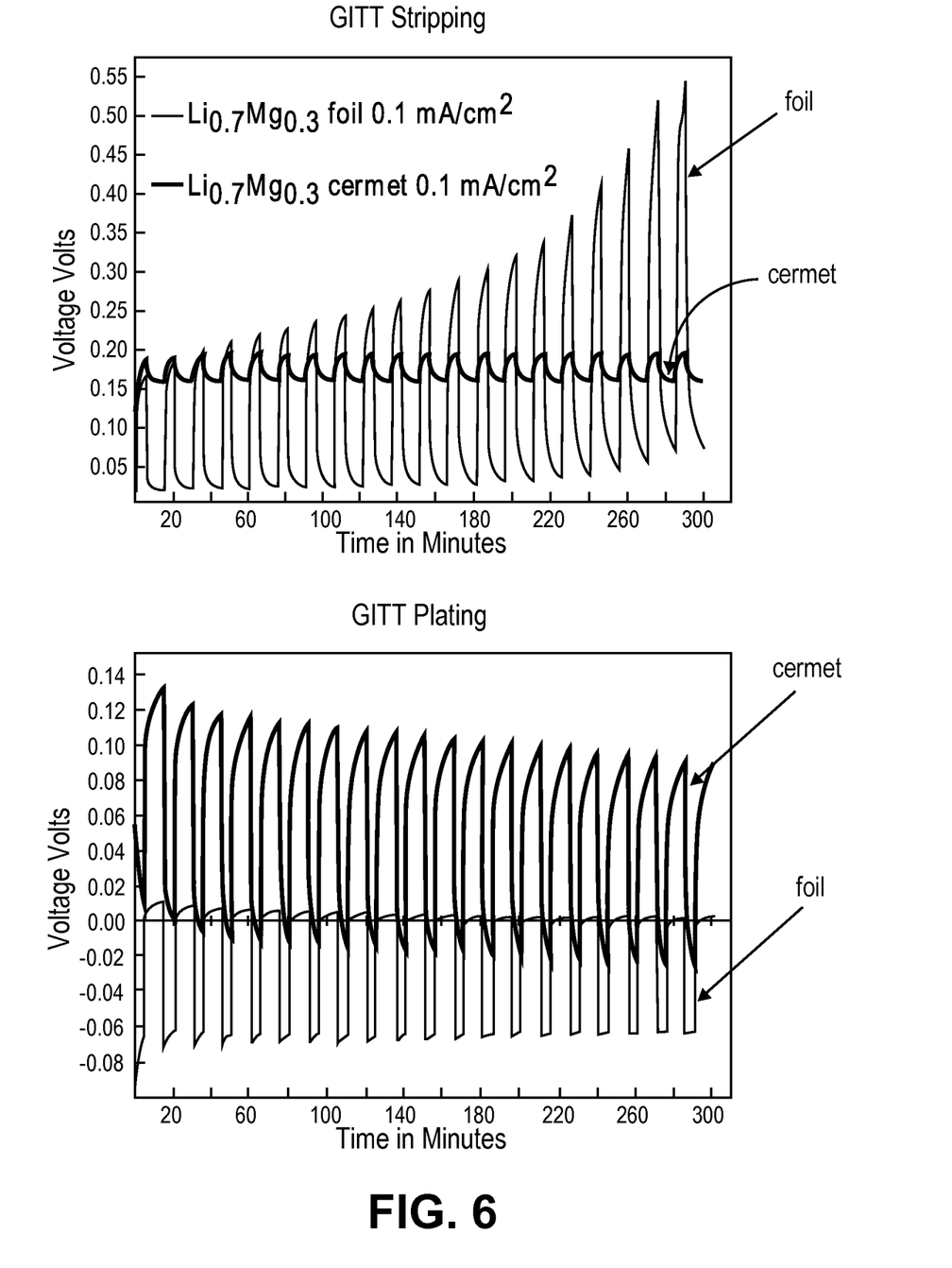
FIG. 6 shows Galvanostatic Intermittent Titration Technique (GITT) plots comparing $Li_{0.7}Mg_{0.3}$ foil and $Li_{0.7}Mg_{0.3}$ cermet electrodes.

In cycling experiments, it has been found that dense Li—Mg cermets perform better than their foil counterparts in terms of rate capability and potential relaxation following stripping. Cells were constructed containing either $Li_{0.7}Mg_{0.3}$ foil or $Li_{0.7}Mg_{0.3}$ cermet electrodes and 1M $LiPF_6$ in ethylene carbonate-ethylmethylcarbonate (3:7). The counter electrodes were lithium in both cases. Stripping and plating experiments were carried out using the Galvanostatic Intermittent Titration Technique (GITT), in which a fixed charge is passed at constant current, followed by relaxation of the cell at open circuit. The results are shown in FIG. 6.

During stripping (removal of lithium), the potential required rose much higher and more rapidly in the foil cell than in the cermet cell. The foil electrode became polarized and did not recover fully during the rest step, leading to further polarization. The cermet electrode, on the other hand, exhibited low polarization and rapid relaxation to its open circuit potential. On plating, the potential required to deposit lithium was less negative for the cermet, and did not reach a steady-state value, indicating that the electrode was still accepting Li into the bulk rather than forming a deposit on the surface. Further, relaxation of the cermet potential at open circuit, although rapid, was not complete, as the added lithium gradually moved into the bulk of the electrode, whereas for the foil, the surface potential became essentially that of Li metal.

Lithium-magnesium alloy electrodes made according to the methods of this invention maintain their physical integrity and appear to suppress the formation of dendrites during stripping and plating of lithium in a non-aqueous electrolyte. Their high lithium content and light weight make them an attractive alternative to carbon anodes. Certain rate limitations, however, must be addressed if they are to be used in high power cells.

These materials offer improvements in performance for negative electrodes for primary and secondary (rechargeable) batteries, electrodes for electro-optical devices such as LEDs and OLEDs. In addition, these materials can be useful as reagents for chemical synthesis or as lightweight structural alloys and cermets for aircraft and other vehicles.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

I claim:

1. A method for forming a lithium-metal composition, comprising:

providing $Li_3N$ powder;
mixing a metal (M) powder into the $Li_3N$ powder to form an alloy phase;
heating the alloy phase from 310° to 480° C. to cause a reaction that forms a free flowing powder comprising grains of a metal nitride coated with a Li-metal alloy or lithium, wherein the Li-metal alloy is a nitrogen free Li-metal alloy or the lithium is a nitrogen free lithium.

2. The method of claim 1, wherein the Li-metal alloy is an intermetallic compound containing lithium.

3. The method of claim 1, wherein the metal is selected from the group consisting of magnesium, aluminum, tin, silicon, antimony, germanium, gallium, indium, and their alloys with one another or with lithium.

4. A lithium metal composition produced by the method of claim 3, wherein the metal nitride is silicon nitride and the lithium-metal composition is lithium-silicon.

5. The lithium metal composition produced by the method of claim 3, wherein the metal nitride is aluminum nitride and the lithium-metal composition is lithium-aluminum.

6. The lithium metal composition produced by the method of claim 3, wherein the metal nitride is magnesium nitride and the lithium-metal composition is lithium-magnesium.

7. The method of claim 1, wherein the $Li_3N$ powder comprises a particle size of <150 μm and the metal (M) powder comprises a particle size of <45 μm.

8. The method of claim 1, wherein the alloy phase is stable over a composition range between about 30% and 100% Li.

9. The method of claim 1, wherein a second metal powder is mixed with the $Li_3N$ powder and the first metal powder prior to heating.

10. The method of claim 9, wherein the first metal powder is magnesium and the second metal powder is tin.

11. The method of claim 9, wherein the first metal powder is magnesium and the second metal powder is silicon.

12. An electrode suitable for use in a lithium ion battery comprising as the active material a nitrogen free lithium-metal composition formed by the reaction process of claim 1.

13. The electrode of claim 12, wherein the electrode is an anode.

* * * * *